United States Patent
Zimmermann et al.

(10) Patent No.: US 6,859,501 B1
(45) Date of Patent: Feb. 22, 2005

(54) SYSTEM FOR TRANSMITTING HIGH-SPEED ADDED-VALUE SERVICES IN TERRESTRIAL DIGITAL BROADCASTING

(75) Inventors: Gerd Zimmermann, Weiterstadt (DE); Henrik Schulze, Meschede (DE)

(73) Assignee: DeutscheTelekom AG, Bonn (DE)

( * ) Notice: Subject to any disclaimer, the term of this patent is extended or adjusted under 35 U.S.C. 154(b) by 0 days.

(21) Appl. No.: 09/403,053

(22) PCT Filed: Mar. 21, 1998

(86) PCT No.: PCT/EP98/01658

§ 371 (c)(1),
(2), (4) Date: Jun. 14, 2000

(87) PCT Pub. No.: WO98/47248

PCT Pub. Date: Oct. 22, 1998

(30) Foreign Application Priority Data

Apr. 11, 1997 (DE) .......................................... 197 15 022

(51) Int. Cl.[7] .............................. H04L 1/08; H04L 27/04
(52) U.S. Cl. ........................................ 375/260; 375/295
(58) Field of Search ................................. 375/260, 261, 375/267, 270, 277, 298, 301

(56) References Cited

U.S. PATENT DOCUMENTS

| 5,784,418 | A | * | 7/1998 | Sykes et al. ................. | 375/347 |
| 5,898,732 | A | * | 4/1999 | Dapper et al. ............... | 375/268 |
| 6,005,894 | A | * | 12/1999 | Kumar ......................... | 375/270 |
| 6,130,915 | A | * | 10/2000 | Hallier et al. ................ | 375/260 |

FOREIGN PATENT DOCUMENTS

| DE | 42 22 877 | 1/1994 |
| DE | 42 37 692 | 3/1994 |
| DE | 43 06 590 | 3/1994 |
| DE | 43 19 217 | 12/1994 |
| DE | 44 41 634 | 6/1996 |
| EP | 0 591 643 | 4/1994 |
| FR | 2 601 210 | 1/1988 |
| GB | 2 261 142 | 5/1993 |

OTHER PUBLICATIONS

"Official EBU Technical Texts EBU Statement D74–1992 EBU Expectations for First–Generation Consumer DAB Receivers Approved For Pubication Dec. 1992", EBU Review—Technical, Nr. 255, Jan. 1, 1993, pp. 57–63.
Thiele, Michael, "Digitaler Rundfunk in den Startlöchern.", Elektronik 11, 1995, pp. 36–38, 43–46, and 48–50 (includes rough English language of abstract and title).

* cited by examiner

*Primary Examiner*—Stephen Chin
*Assistant Examiner*—Lawrence Williams
(74) *Attorney, Agent, or Firm*—Kenyon & Kenyon

(57) ABSTRACT

A broadband multi-frequency-block Extended Digital Audio Broadcasting X-DAB) transmission method for the interference-free transmission of value-added services at a high data rate to mobile receivers within an analog television channel. At least two simultaneously-broadcast adjacent X-DAB frequency blocks in a single-frequency network are provided. A digital input data stream is multiplexed onto the frequency blocks, with the input data steam being source-coded according to the service content of the input data stream. The input data stream is separated into a plurality of individual dens streams, with the individual data steams each having a respective quality of service importance and being distributed according to the respective quality of service importance among the at least two frequency blocks. The method offers a high degree of flexibility with regard to error protection profiles and thus data rates, and permits the implementation of non-constant-ratio error protection profiles, as well as hierarchical transmission.

8 Claims, 8 Drawing Sheets

SYSTEM FOR TRANSMITTING HIGH-SPEED ADDED-VALUE SERVICES IN TERRESTRIAL DIGITAL BROADCASTING

FIELD OF THE INVENTION

The present invention relates generally to a method for the transmission of high-rate value added services, and, in particular, to a method for the transmission of high-rate value-added services according to the Extended Digital Audio Broadcasting (X-DAB) system.

RELATED TECHNOLOGY

The present invention lies in the field of the future digital radio broadcasting: "Digital Audio Broadcasting" (DAB), which was standardized in February 1995 by the European Telecommunication Standards Institute. DAB is suitable for the transmission of qualitatively high-grade audio programs to mobile, portable and fixed receivers, the real objective being mobile reception. One of the special features of DAB is the transmissibility of additional data at normally relatively low data rates, such as program-accompanying information, traffic information and the like. A plurality of audio programs and data services, respectively, are combined in a "DAB ensemble" and are broadcast jointly by the COFDM (Coded Orthogonal Frequency Division Multiplexing) multi-carrier transmission process in a frequency block of a width of approximately 1.5 MHz.

Recently, program providers have shown great interest in using DAB also to transmit value-added services such as video programs at a higher data rate. In the limiting case, this data rate may occupy the capacity of the entire DAB ensemble. One of the problems in this regard is that of error protection, which, at the maximum net data rate of 1.728 Mbit/s usable in the DAB system is so weak that the system is not suitable without restriction for mobile reception. Therefore, with acceptable error protection, interference-free transmission is only possible in the range of data rates up to approximately 1.2 Mbit/s.

Relative to the DAB system, the X-DAB system (Extended DAB) represents a downward-compatible, qualitatively higher-grade alternative to the DAB system, the X-DAB system retaining unchanged the physical parameters of the utilized OFDM multi-carrier transmission process as well as the basic structure of a transmission frame according to the DAB system. For special X-DAB data channels, in comparison with the DAB system, it is possible to obtain better interference immunity, accompanied at the same time by a higher data rate, through the use of coded modulation (multi-stage codes in conjunction with a higher-stage phase modulation of, for example, 8-PSK). Implementation of the X-DAB system makes it possible at any time to transmit a net data rate of 1.728 Mbit/s without restriction to the mobile user per DAB frequency block. It is even possible to achieve a maximum rate, of over 2 Mbit/s, but with an increase in the required signal-to-noise ratio at the receiver end in comparison with the lower data rate.

If the intention is to transmit high-grade value-added services, such as video programs in PAL quality, to mobile users, then the data rates achievable by the DAB and X-DAB systems are still too low. At present, a standard for the terrestrial broadcasting of digital television (DVB-T) is soon to be published by the responsible authority, the ETSI. It may be that the DVB-T system makes it possible to transmit high data rates—namely up to a maximum of about 30 Mbit/s per television channel of a bandwidth of 7 MHz in the VBT range or 8 MHz in the UHF range; however, the system concept, which is likewise based on the COFDM method, is designed primarily for supplying stationary and portable receivers. That is, mobile reception is possible only to a very limited extent even if use is made of a non-standardized expansion of the DVB-T system with regard to the type of modulation. See, for example, German Patent No. 4319 217 C2, which is hereby incorporated by reference herein. In order just to come approximately within the range of the receiver-end signal-to-noise ratio available with the DAB system, it is possible with the DVB-T system to employ no more than a four-phase modulation on the subcarriers, as is used also in the DAB system. That is, in this case, the maximum transmissible data rate per television channel still amounts to approximately 6 Mbit/s.

In conjunction with the DAB system, German Patent Application No. 43 06 590 A1, which is hereby incorporated by reference herein, has proposed that four adjacent frequency blocks be broadcast simultaneously in one television channel, the correspondingly source-coded data stream (such as MPEG-2 for video and audio) being multiplexed onto the frequency blocks, whereby with a broadband DAB receiver, composed of four parallel-arranged receivers arranged with a final output combiner, it is possible to evaluate a net data rate of max. 4×1.728=6.9 Mbit/s. If an error protection adapted to mobile conditions is used, this net data rate will still be approximately 4.6 Mbit/s. However, there is a need to further increase this data rate in order to optimize the transmission quality.

SUMMARY OF THE INVENTION

An object of the present invention is to provide a method for the transmission of high-rate value-added services which reliably ensures transmission at even higher data rates than previously possible with the DAB system.

The present invention provides a method for the transmission of video programs, particularly to mobile users, utilizing at least two simultaneously broadcast, adjacent X-DAB frequency blocks in a single frequency network, a digital input stream, source-coded according to the respective service contents, being multiplexed onto the frequency blocks. According to the invention, a free carrier frequency is inserted between the X-DAB frequency blocks. It is thus possible to dispense with a guard separation of 0.2 MHz or greater between two frequency blocks. In this manner, the band-width requirement for the X-DAB frequency blocks is reduced, so that it is advantageously possible, within a channel having a predefined band width, to transmit a higher number of adjacent X-DAB frequency blocks within the predefined band width, thus permitting a higher transmission rate.

According to an embodiment of the present invention, in order to increase the transmission rate, according to the invention, the input data stream is separated into a plurality of individual data streams, these individual data streams having different significance or importance for the quality of the service, and the individual data streams are distributed, according to their significance or importance, between individual X-DAB frequency blocks. This transmission of a data stream, also described as hierarchical transmission, makes it possible to strengthen error protection for more important partial data streams or individual data streams, and to reduce the error protection for those which are less important, but in exchange, to transmit a higher data rate in the case of the partial data streams which are less important. This makes it possible to increase the transmission data rate overall.

Advantageously, during transmission according to the invention, the output signals of the four X-DAB narrow-band transmitters, which provide the four X-DAB frequency blocks, are combined into one common output signal and are thereupon transmitted, for which purpose a summing circuit is provided whose output is connected to an HF stage. At the input end, during the transmission process, the input data stream is split at the input end between the four X-DAB transmitters by a service-splitting circuit.

As an alternative to the summing of the output signals from the plurality of X-DAB transmitters, in order to prevent disturbances of the condition of orthogonality between the subcarriers of the adjacent frequency blocks, provision is advantageously made for combining the signals corresponding to the plurality of X-DAB transmitters at the level of the digital baseband signal processing after a differential modulation of the subcarriers of individual blocks, yet before the actual OFDM signal generation. Advantageously, the OFDM signals are expediently generated by Inverse Fast Fourier Transformation (IFFT), followed by D/A conversion and I/Q modulation.

The bundling of a plurality of, for example four, X-DAB frequency blocks to the advantage of a broadband X-DAB, BX-DAB system within a normal television channel permits the interference-free transmission of value-added services at a high data rate in particular to mobile receivers at a typical data rate of 6.9 Mbit/s.

The system concept according to the present invention offers a high degree of flexibility with regard to different error-protection profiles and thus data rates, the profiles, in the transmission of a data frame, being switchable within a frequency block and also between the blocks with regard to the individual data streams of the source signal. In contrast to the above-described DVB-T system, this makes it possible to implement both a constant-ratio and a non-constant-ratio error protection. The system concept is also suitable for a type of hierarchical transmission, where, in contrast to the DVB-T system, the difference lies not in the type of modulation on the individual OFDM subcarriers, but in the number of frequency blocks to be evaluated.

BRIEF DESCRIPTION OF THE DRAWINGS

Following, the preset invention is described in greater detail by way of example, with reference to the drawings, in which.

DETAILED DESCRIPTION

As noted above, there is a need for new system concepts making it possible to also provide value-added services at higher data rates for mobile receivers without any appreciable loss of quality. Through recourse to already existing systems such as DAB or, as in the case according to the invention, to X-DAB as the basic structure, it is possible to significantly reduce the costs of hardware development for the transmitter and receiver ends.

Figure 1:
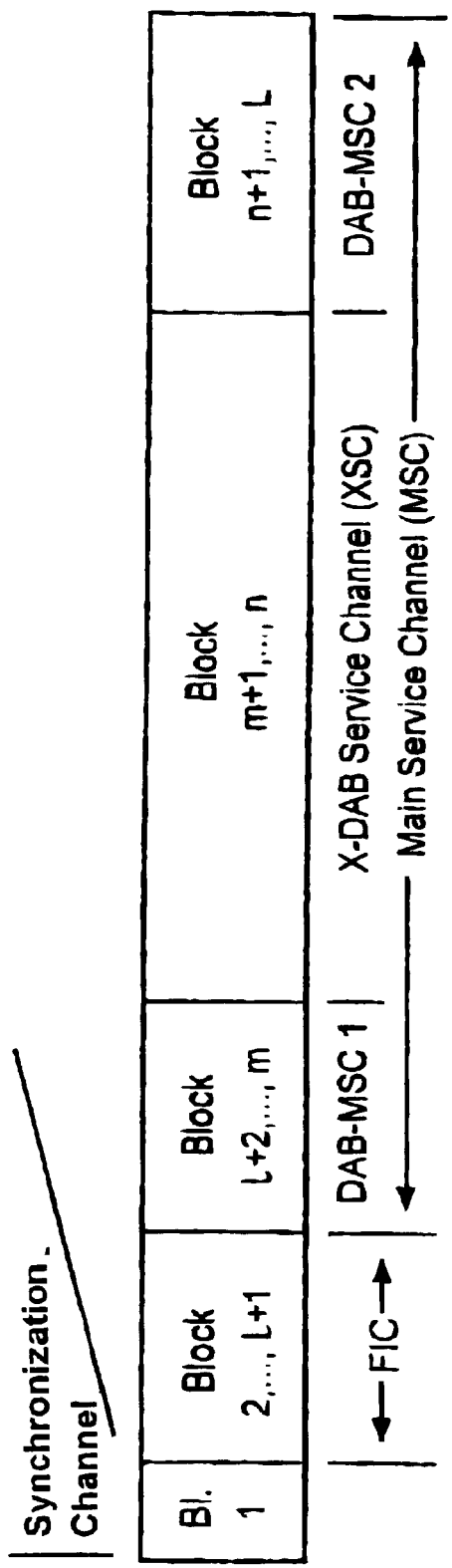
FIG. 1 shows the structure of the transmission frame for the X-DAB system for each frequency block.
Figure 2:
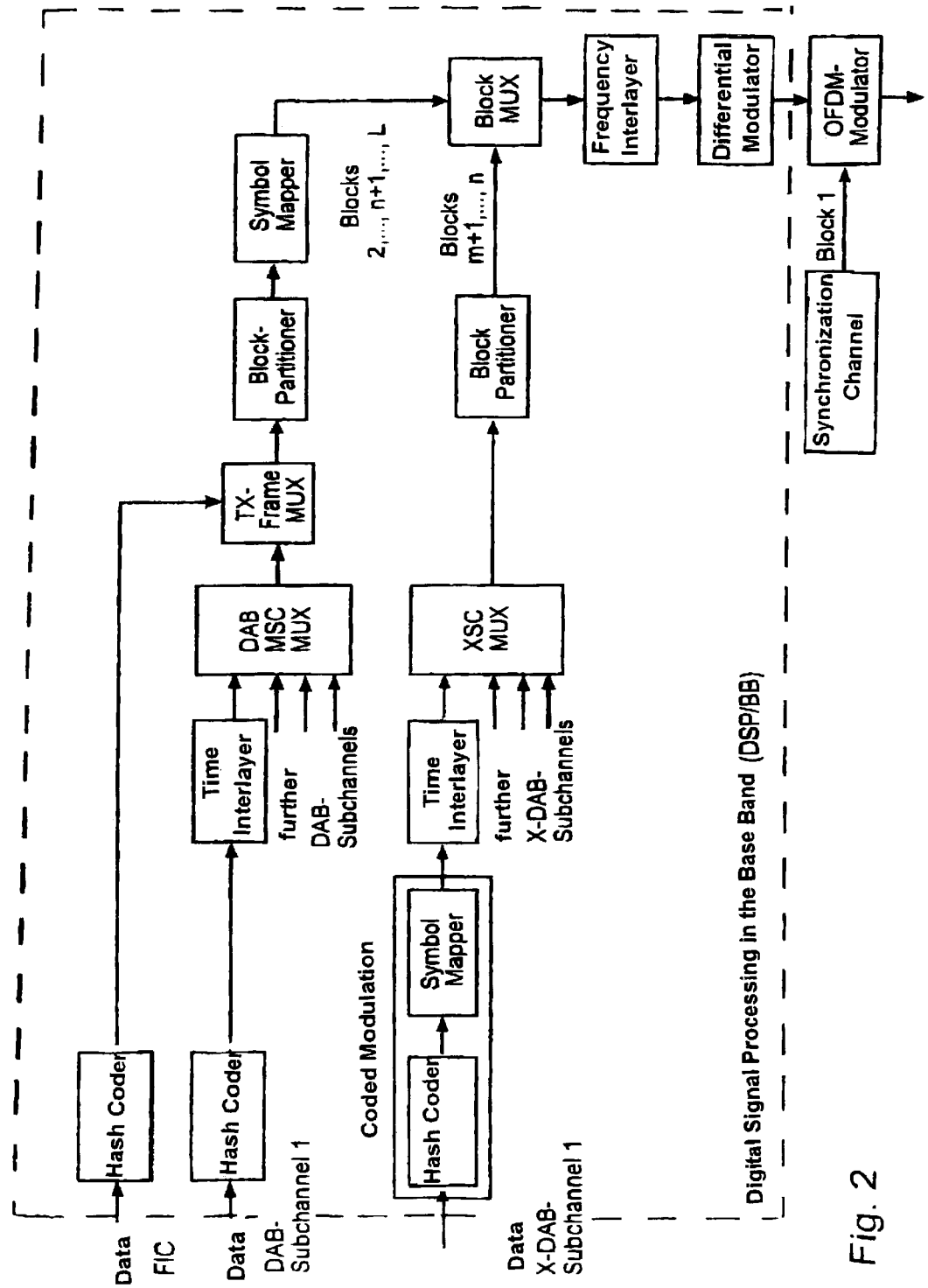
FIG. 2 shows a block diagram of a narrow-band X-DAB transmitter.
Figure 3:
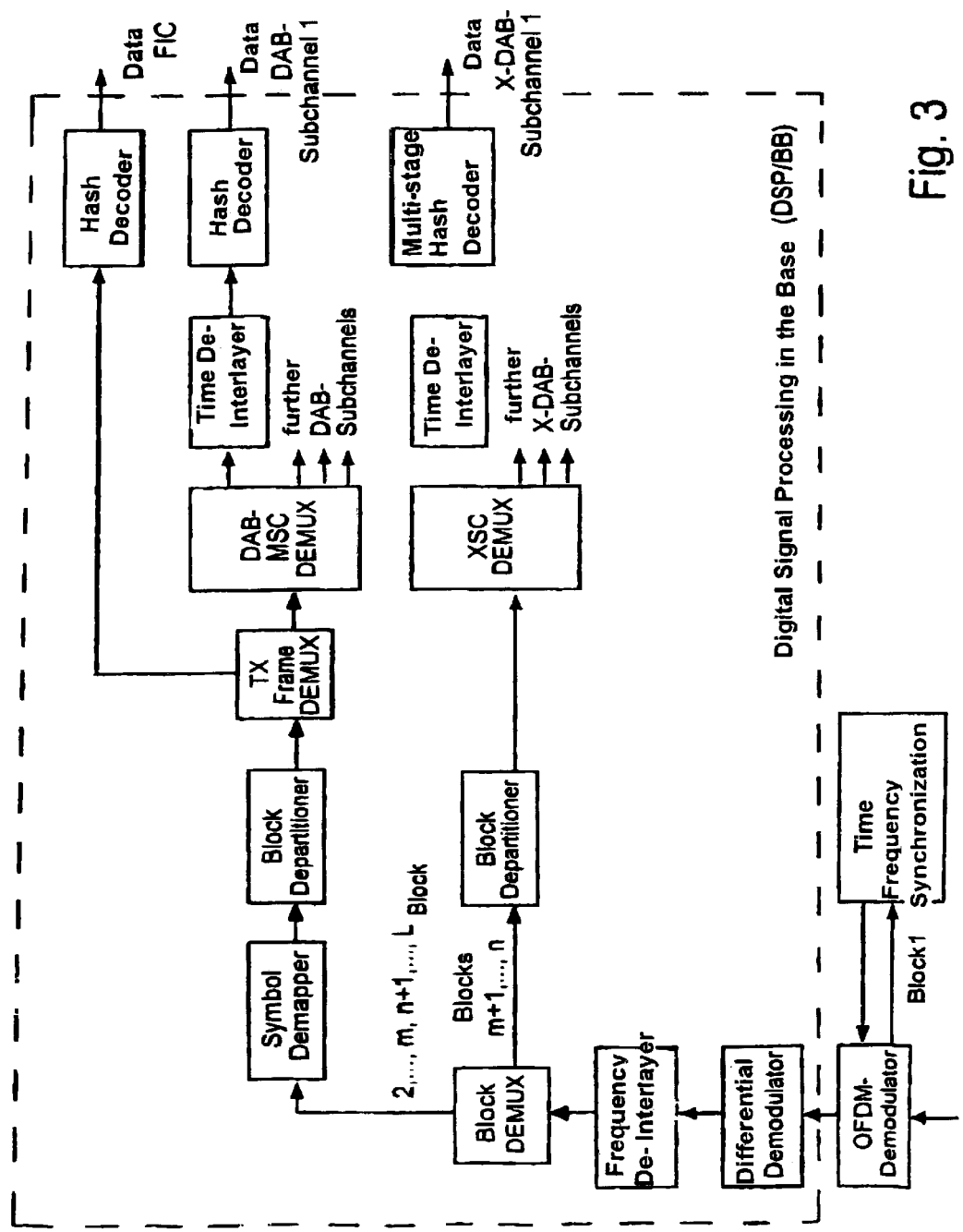
FIG. 3 shows a block diagram of a narrow-band X-DAB receiver.

For example, four different parameter sets (transmission modes) which describe the physical parameters of the transmission frame and of the OFDM process exist for the DAB system. These parameter sets are identical for the X-DAB system. For example, in the "transmission mode II", a frame corresponds to a duration of 24 ms and contains L=76 OFDM symbols, of which the first is occupied by the synchronization signal and the next 1–3 by the control channel (fast information channel, FIC), as shown in FIG. 1. The remaining symbols, which form the main service channel (MSC), are available for the transmission of useful data. A block in the transmission frame corresponds to the data contents which can be transmitted within an OFDM symbol. Each service occupies its own area, the so-called subchannel, in the MSC. Also integrated in the MSC is the XSC (X-DAB Service Channel) which, in extreme cases, may take up the entire MSC capacity. However, such an extreme case occurs only if a service is to be transmitted at a high data rate, i.e. in this case, the MSC or XSC contras only one subchannel. The number K of subcarriers used in the OFDM process is likewise different for the individual transmission modes and ranges from K=192 for mode III to K=1536 for mode 1. FIGS. 2 and 3 show corresponding block diagrams of an X-DAB transmitter and receiver, respectively.

Figure 4:
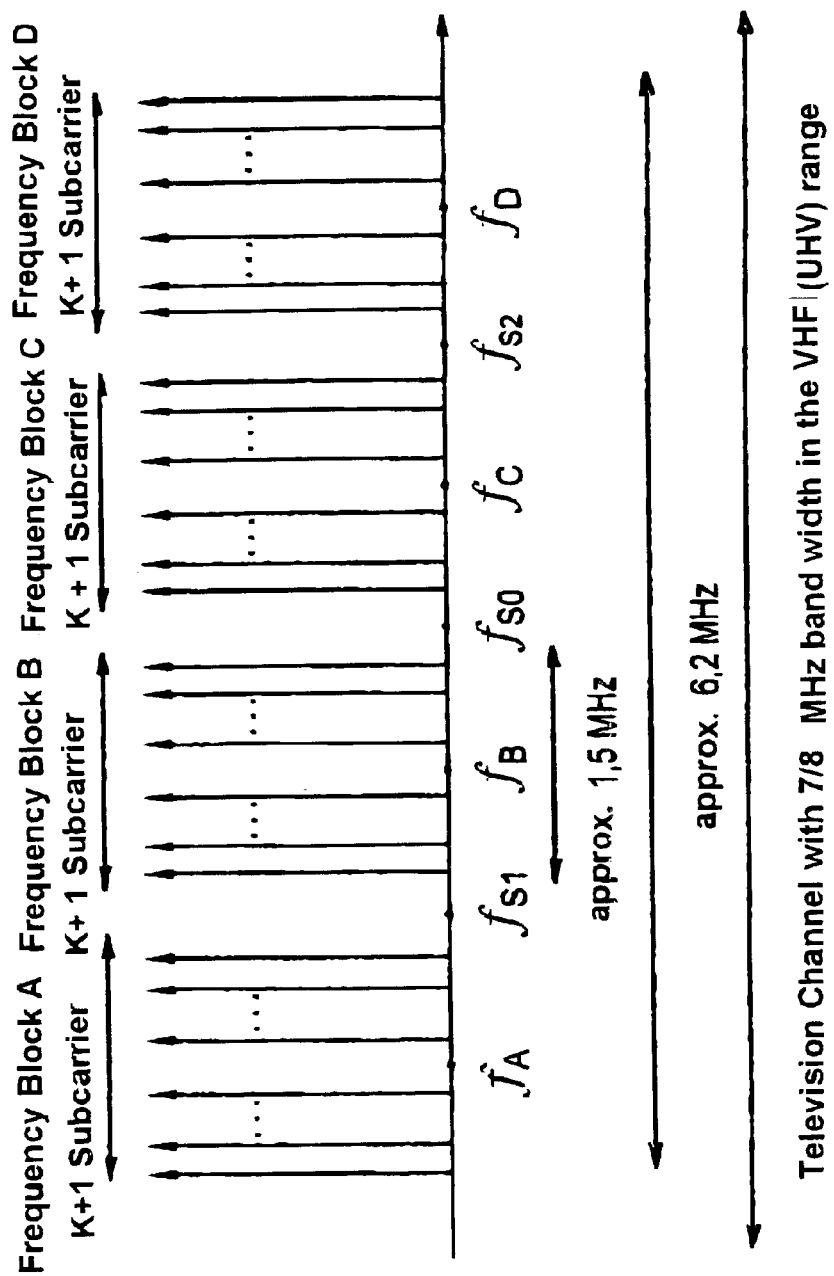
FIG. 4 shows the distribution of the X-DAB frequency blocks within an analog television channel as part of the yielding of a transmission signal according to the transmission method of the present invention.

In conformance with the proposed design approach according to the invention, a plurality of, in the present case up to four narrow-band X-DAB frequency blocks, which are simultaneously broadcast by all transmitters of a common-wave or single-frequency network, are accommodated in a television channel with a bandwidth of 7 or 8 MHz (VHF or UHF range), as shown in FIG. 4. The maximum data rate achievable thereby per channel by bundling the capacity of the individual frequency blocks, i.e. the ensemble contents is approximately 8.3 Mbit/s in the case of four frequency blocks. If use is made of error protection adapted to mobile reception, 6.9 Mbit/s thereof is still left for the transmission of useful data. That is, per data channel, approximately 4 MPEG-2 coded video programs in VHS quality including stereo sound, or one to two programs in PAL quality can be transmitted and received by mobile users.

In addition, the capacity of the four fast information channels (FIC) is available for the transmission of additional data (Fast Information Data Charnel, FIDC), each with about 32 kbit/s (mode III: 43 kbit/s).

The frequency blocks are advantageously arranged in such a manner that the individual subcarriers of all the blocks lie in the same radio-frequency pattern $\Delta f$. The radio-frequency pattern $\Delta f$ is defined by the useful interval duration $T_U$ of an OFDM symbol: $\Delta f = 1/T_U$. The smallest carrier interval is in mode 1: $\Delta f=1$ kHz, and the largest in mode III: $\Delta f=8$ kHz.

It is advantageously possible to dispense with a greater guard separation of 0.2 MHz, as is required in the customary allocation of frequencies for the DAB system in order to prevent adjacent-channel interference between individual frequency blocks. Merely one single, unassigned carrier frequency is preferably additionally inserted between the frequency blocks. Taking account of the fact that the carrier on the respective block mid-frequency is also not assigned, the bandwidth requirement for the four frequency blocks results as:

$$K'^*\Delta f = (4^*(K+1)+3)^*\Delta f = (4^*K+7)^*\Delta f.$$

If use is made of the known DAB or X-DAB parameters, there results a value of approximately 6.2 MHz for all modes. This system concept is referred to hereinafter as BX-DAB (Broadband X-DAB).

Figure 5:
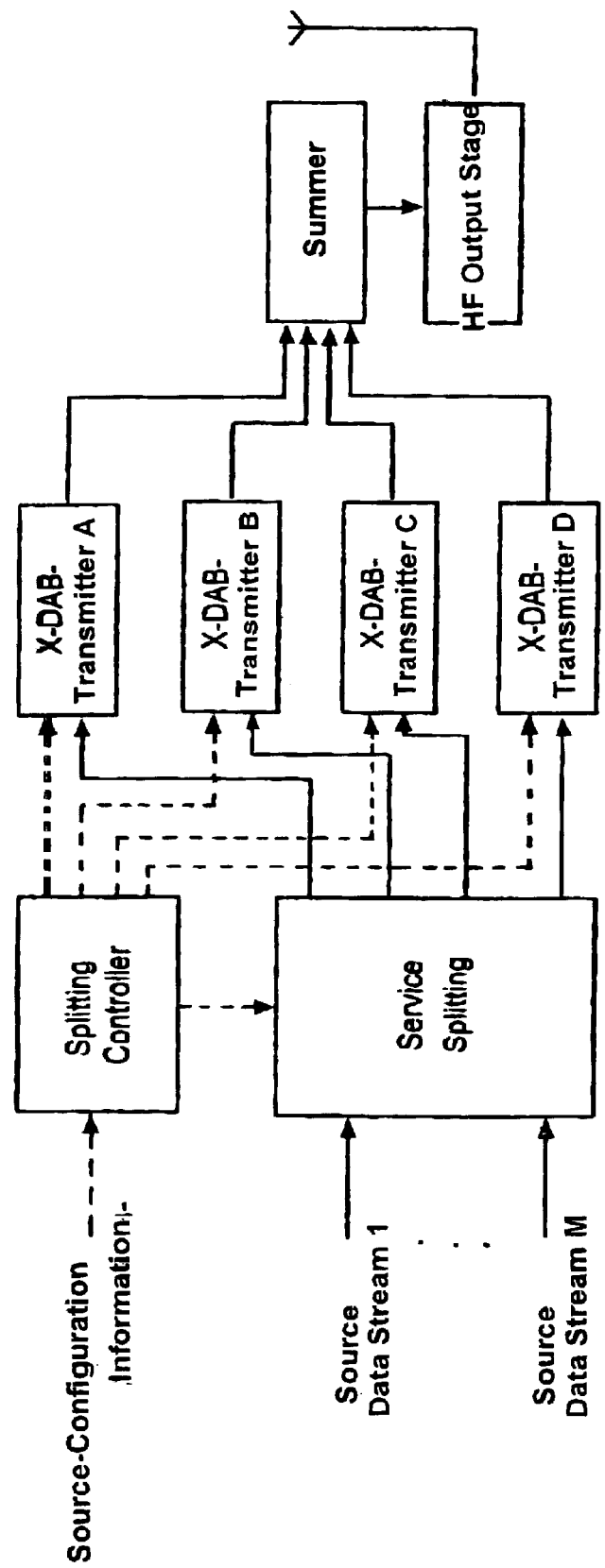
FIG. 5 shows a block diagram of a broadband X-DAB transmitter.

Basically, after an appropriate service splitting of the input data stream, which may possibly originate from a plurality of sources, the desired broadband transmission signal can be generated by a multiple, in the present case a four-fold parallel connection of known X-DAB transmitters according to FIG. 2 and subsequent addition of the output signals of these transmitters. This situation is presented in FIG. 5. A separate controller monitors the service splitting and generates the necessary multiplex information (MCI) for the FIC. However, owing to inaccuracies of the respective transmission oscillators with the transmission mid-frequencies $f_A$, $f_B$, $f_C$ and $f_D$, the transmission signal may in this case already contain disturbances of the condition of orthogonality between the subcarriers of the adjacent frequency blocks, which, because of the lack of a guard separation, may ultimately result in inter-carrier interference (ICI) and thus in a deterioration of the transmission quality.

Figure 6:
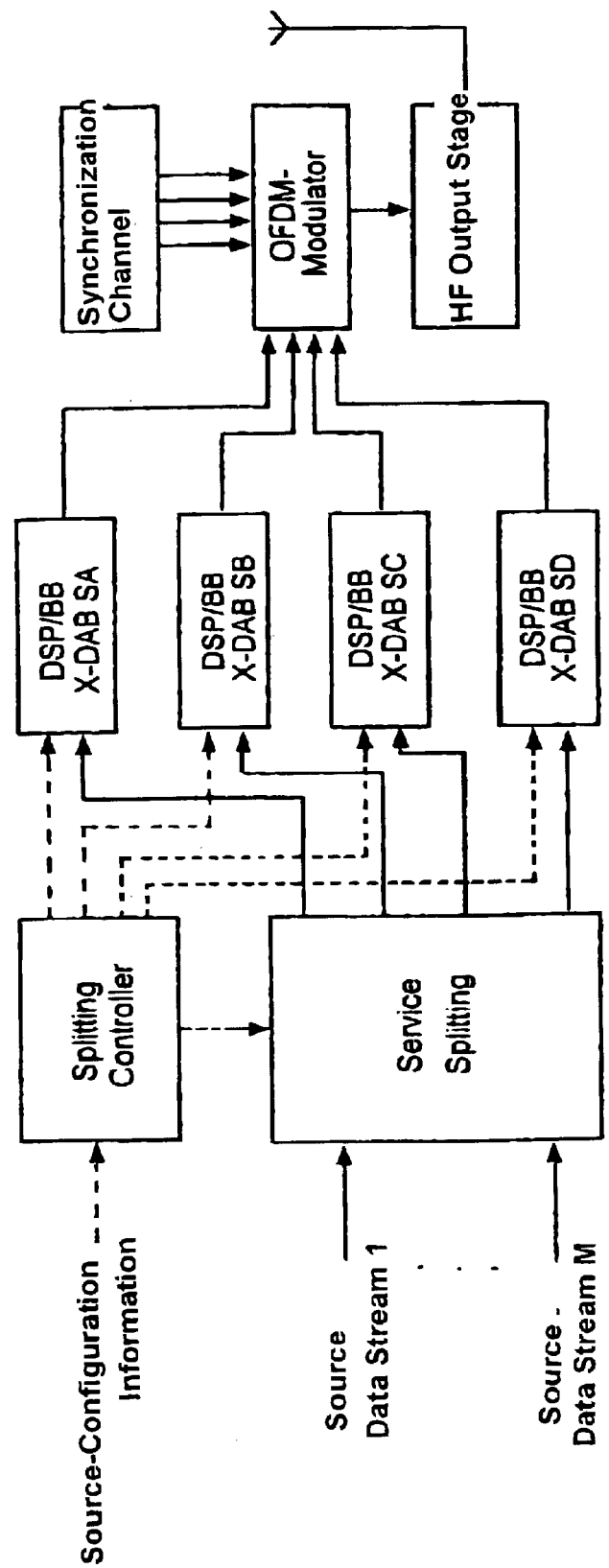
FIG. 6 shows a block diagram of a broadband X-DAB transmitter.

FIG. 6 shows a specific embodiment of the transmitter which does not exhibit these disadvantages. Accordingly, the signals are combined at the level of the digital baseband signal processing (DSP/BB X-DAB SA-SD) after differential modulation of the subcarriers of the individual blocks, and still before the actual OFDM signal generation. The OFDM signal generation can be implemented by a module for Inverse Fast Fourier Transformation (IFFT), followed by a D/A converter and then an I/Q modulator. It is of advantage in this regard that, whereas in the first embodiment of the transmitter according to the invention for the individual frequency blocks, it is necessary in each case to use an IFFT of size N>K+1, with N as a power of two (N=256 for mode III to N=2048 for mode I), in order to generate a timing signal belonging to an OFDM symbol, in the specific embodiment shown in FIG. 6, only one IFF of size N'>K' is necessary (N'=1024 for mode III to N'=8192 for mode I). Each X-DAB block is allocated a fixed assignment—dependent on the selected mode of the IFFT input vector on which the corresponding, differentially modulated PSK symbols are stored. Following the IFFT, all that is then required in the transmitter is a single D/A conversion (one module each for the I- and Q-channels) as well as a single I/Q modulator. However, owing to the greater IFFT bandwidth, the D/A conversion must be carried out at four times the clock-pulse rate, i.e. the duration of the sampling interval after the IFFT is only about 0.122 $\mu$s instead of 0.48 $\mu$s in the first embodiment of the transmitter. The frequency $f_{S0}$ is used as the transmission mid-frequency, as shown in FIG. 4.

Broadband X-DAB receivers shall now be explained with reference to FIGS. 7 and 8.

Figure 7:
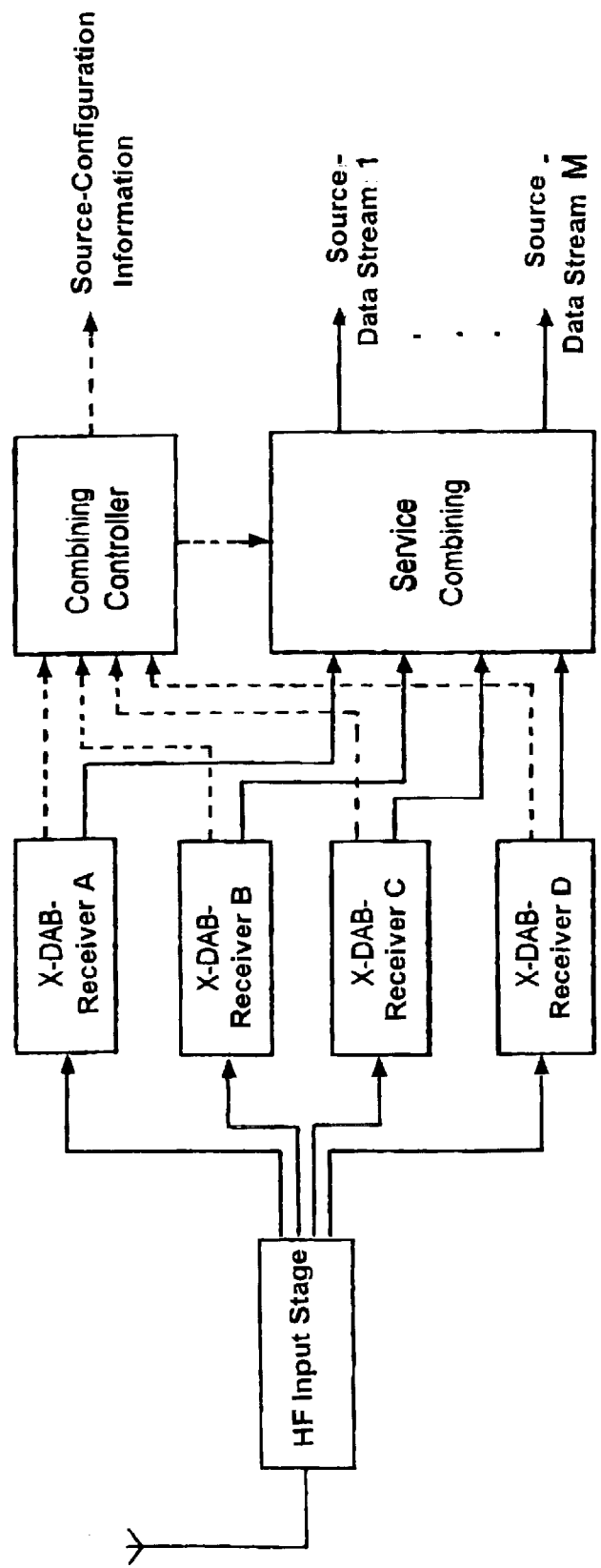
FIG. 7 shows a block diagram of a broadband X-DAB receiver.
Figure 8:
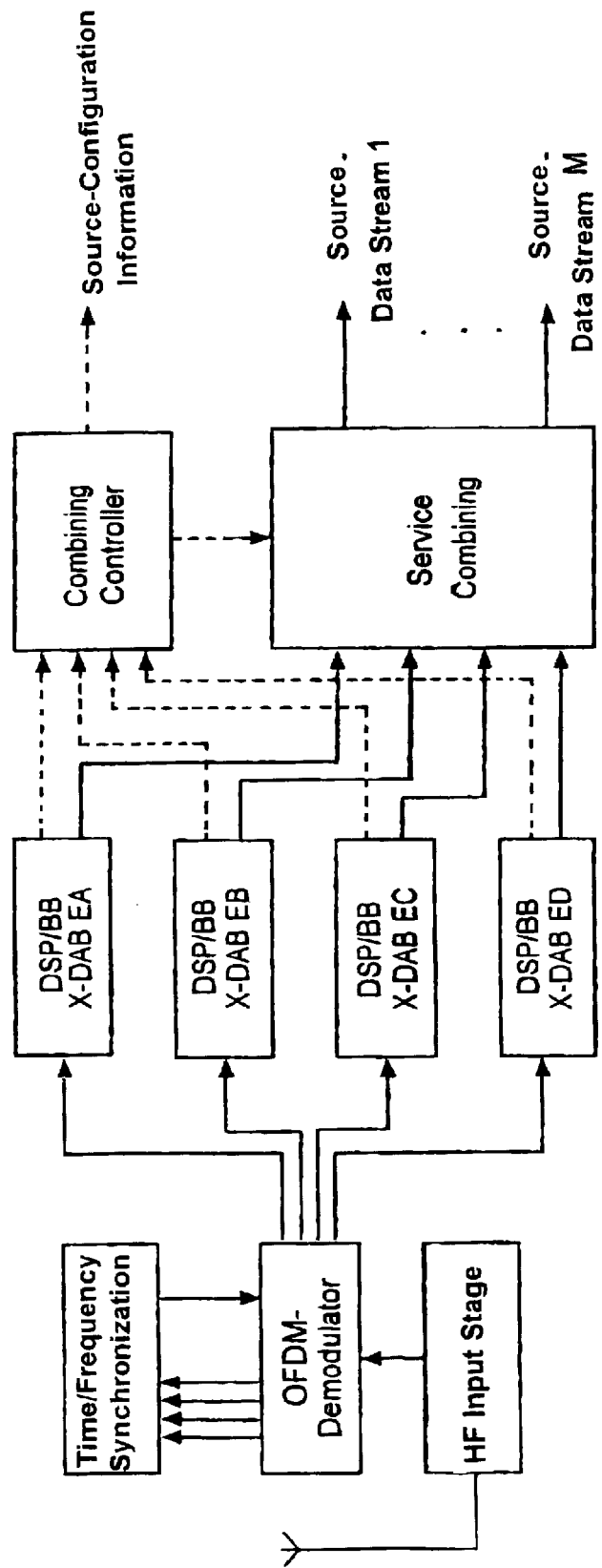
FIG. 8 shows a block diagram of a broadband X-DAB receiver.

In order, at the receiving end of the transmitting, to be able to evaluate the entire data stream in the broadband transmission signal, two principles are possible as shown in FIGS. 7 and 8. First, if there are four narrow-band X-DAB transmitters at the transmitter end, it is possible to employ four narrow-band X-DAB receivers in parallel which and tuned to the respective frequency-block mid-frequencies $f_A$ to $f_D$ and which thus evaluate the ensemble contents of the corresponding block (see FIG. 7). Owing to the fact that the frequency blocks are directly adjacent to each other, if narrow-band receivers are used, there is inter-carrier interference (ICI) because the subcarriers belonging to the adjacent blocks are included in the FFT module of the OFDM demodulator. However, this has virtually no adverse effect on the transmission quality, since, in the previously discussed transmitter implementation (see FIG. 6), all the carriers are in the same radio-frequency pattern, with the result that the condition of orthogonality is not violated. Furthermore, the negative consequences of the Doppler effect for mobile reception are only minimally amplified due to this. The four receiver output data streams are again combined in the service combiner to form one or more overall data streams. The control of the just-described broadband receiver with regard to the data streams is effected in the combining controller on the basis of the evaluation of the information transmitted in the FICs, analogous to the DAB or X-DAB concept.

FIG. 8 shows an alternative to the above-described receiver, analogous to the transmitter shown in FIG. 6. Instead of using four narrow-band receivers directly in parallel, it is thus possible for the signal to be recovered using just one OFDM demodulator. This broadband receiver can be implemented by an I/Q demodulator tuned to the frequency $f_{S0}$, an A/D converter for each of the I- and Q-branches, as well as a subsequent FFT of size N'. The values of the FFT output vector can, after corresponding allocation, again be allocated to the digital baseband signal processing of four parallel X-DAB receivers (DSP/BB X-DAB EA-ED) whose output data stream, as described above, are subsequently combined to form an overall data stream.

This second embodiment of the receiver according to the invention is superior to its first embodiment when it is a matter of evaluating the entire data stream. However, with the above-described broadband X-DAB transmitter/receiver concept, it is also possible to accomplish a so-called hierarchical transmission of a data steam. This requires that the source data stream can be separated into a plurality of individual streams, these having different significance or importance for the quality of the associated service, for example with regard to image quality. Thus, it is possible, for example, to increase the error protection for more important data streams and to reduce it for less important ones, but in return, to transmit a higher data rate in this area. Changes in error protection even within a transmission frame are easy to implement with the X-DAB system, but are not possible with the DVB-T system described at the outset. If, at the transmitter end, the data streams are distributed according to their importance among the individual frequency blocks beginning, for example, with the lowest frequency, then reception quality and receiver costs can be exchanged for each other, a technically simple receiver, for example, evaluating only one frequency block such as block 1, which is tuned to the mid-frequency $f_A$. In this case, the receiver is identical with the normal X-DAB narrow-band receiver with the maximum FFT size N'=N= 2048. In order to improve the service quality, it is necessary for a further block to be added and co-evaluated, for example block 2, tuned to the mid-frequency $f_{S1}$. Since an FFT of the maximum size N'=4096 is required, the receiver must already be correspondingly broad-band. In the case of video transmission, this may signify, for example, a quality step from VHS to PAL. In this scheme, frequency blocks 3 and 4 may likewise be assigned to a separate service and be evaluated independently of frequency blocks 1 and 2, the receiver being tuned to mid-frequency $f_{S2}$.

With regard to the above-described frequency blocks, it is also possible for an additional substream to be transmitted to frequency block 1 or 2, this contributing to a further improvement in the quality of the service. In order, for example, to achieve full image quality in this case, it is necessary to use the most complex and thus most costly receiver, with the maximum FFT size N=8192 given four-fold parallelization of the X-DAB baseband signal processing. The arrangement of an unassigned carrier between the individual frequency blocks has, for all receiver types irrespective of FFT size and the accordingly-selected mid-frequency, the consequence that the input signal is always without a direct component, this guaranteeing optimal modulation of the A/D converters.

What is claimed is:

1. A method for transmission of high-rate value-added services to mobile users, the method comprising:

providing at least two simultaneously-broadcast adjacent extended digital broadcasting system frequency blocks in a singe-frequency network;

multiplexing a digital input data steam unto the at least two frequency blocks, the input data stream being source-coded according to a service content of the input data stream; and inserting a free carrier frequency between the at least two frequency blocks.

2. A method for transmission of high-rate value-added services to mobile users, the method comprising:

providing at least two simultaneously-broadcast adjacent extended digital broadcasting system frequency blocks in a single-frequency network;

multiplexing a digital input data stream onto the at least two frequency blocks, the input data stream being source-coded according to a service content of the input data stream; and separating the input data stream into a plurality of individual data streams, the plurality of individual data steams each having a respective quality of service importance and being distributed according to the respective quality of service importance among the at least two frequency blocks.

3. The transmission method as recited in claim 1 further comprising:

combining signals corresponding to the at least two frequency blocks into a common output signal; and transmitting the common output signal.

4. The method for transmission as recited in claim 2, further comprising:

combining signals corresponding to the at least two frequency blocks into a common output signal; and transmitting the common output signal.

5. The method for transmission as recited in claim 1, further comprising:

differentially modulating respective subcarriers of the at least two frequency blocks; then combining signals corresponding to the at least two frequency blocks into a common output signal; and then generating at least one orthogonal frequency division multiplex signal.

6. The method for transmission as recited in claim 2 further comprising:

differentially modulating respective subcarriers of the at least two frequency blocks; then combining signals corresponding to the at least two frequency into a common output signal; and then generating at least one orthogonal frequency division multiplex signal.

7. The method for transmission as recited in claim 5 wherein the generating is performed using an Inverse Fast Fourier Transformation followed by a D/A conversion and an I/Q modulation.

8. The method for transmission as recited in claim 6, wherein the generating is performed using an Inverse Fast Fourier Transformation followed by a D/A conversion and an I/Q modulation.

* * * * *